（12） United States Patent
Cho et al.

(10) Patent No.: US 9,246,155 B2
(45) Date of Patent: Jan. 26, 2016

(54) RECHARGEABLE SECONDARY BATTERY HAVING IMPROVED SAFETY AGAINST PUNCTURE AND COLLAPSE

(75) Inventors: Kyuwon Cho, Yongin-si (KR); Yongsam Kim, Yongin-si (KR); Yoontai Kwak, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 1110 days.

(21) Appl. No.: 12/916,375

(22) Filed: Oct. 29, 2010

(65) Prior Publication Data

US 2011/0136002 A1 Jun. 9, 2011

Related U.S. Application Data

(60) Provisional application No. 61/267,354, filed on Dec. 7, 2009.

(30) Foreign Application Priority Data

May 7, 2010 (KR) ........................ 10-2010-0042962

(51) Int. Cl.
*H01M 2/26* (2006.01)
*H01M 2/34* (2006.01)
(Continued)

(52) U.S. Cl.
CPC .............. *H01M 2/263* (2013.01); *H01M 2/266* (2013.01); *H01M 2/34* (2013.01); *H01M 2/345* (2013.01);
(Continued)

(58) Field of Classification Search
CPC .......... H01M 10/0413; H01M 10/052; H01M 10/0585; H01M 10/0587; H01M 2/263; H01M 2/266; H01M 2/34; H01M 2/345; H01M 2/347; Y02E 60/122; Y02T 10/7011
USPC ......... 429/129, 133, 162, 178, 186, 208–209, 429/211, 121, 123, 130, 138; 29/623.1
See application file for complete search history.

(56) References Cited

U.S. PATENT DOCUMENTS 4,019,251 A 4/1977 McCole
5,989,743 A 11/1999 Yamashita
(Continued)

FOREIGN PATENT DOCUMENTS

CN 1713441 A 12/2005
EP 2 197 070 A1 6/2010
(Continued)

OTHER PUBLICATIONS

Machine Translation and Abstract in English of KR 1020080010735A.*
(Continued)

*Primary Examiner* — Patrick Ryan
*Assistant Examiner* — Ben Lewis
(74) *Attorney, Agent, or Firm* — Christie, Parker & Hale, LLP (57) ABSTRACT

Disclosed is a secondary battery having improved safety against puncture and collapse. The secondary battery includes an electrode assembly including a first electrode, a second electrode, and a separator between the first electrode and the second electrode, a case receiving the electrode assembly, a cap plate coupled to the case, and a support plate electrically coupled to the first and second electrodes of the electrode assembly, the support plate being disposed between the electrode assembly and the case.

17 Claims, 9 Drawing Sheets (51) Int. Cl.
*H01M 10/04* (2006.01)
*H01M 10/052* (2010.01)
*H01M 10/0585* (2010.01)
*H01M 10/0587* (2010.01)

(52) U.S. Cl.
CPC .......... *H01M 2/347* (2013.01); *H01M 10/0413* (2013.01); *H01M 10/052* (2013.01); *H01M 10/0585* (2013.01); *H01M 10/0587* (2013.01); *Y02E 60/122* (2013.01); *Y02T 10/7011* (2013.01)

(56) References Cited

U.S. PATENT DOCUMENTS

| | | |
|---|---|---|
| 6,312,848 B1 | 11/2001 | Kilb et al. |
| 6,402,793 B1 | 6/2002 | Miltich et al. |
| 2003/0044677 A1 | 3/2003 | Naruoka |
| 2004/0028999 A1 | 2/2004 | Richard et al. |
| 2005/0287429 A1 | 12/2005 | Cho et al. |
| 2006/0051664 A1 | 3/2006 | Tasai et al. |
| 2006/0115722 A1 | 6/2006 | Kim |
| 2006/0126609 A1 | 6/2006 | Krockel |
| 2009/0104525 A1 | 4/2009 | Nakagawa et al. |
| 2010/0159315 A1 | 6/2010 | Imasaka et al. |
| 2011/0045344 A1 | 2/2011 | Kim |
| 2011/0159358 A1 | 6/2011 | Liu et al. |

FOREIGN PATENT DOCUMENTS

| | | | | |
|---|---|---|---|---|
| EP | 2 330 661 A1 | 6/2011 | | |
| GB | 2 068 633 A | 8/1981 | | |
| JP | 10261428 A | * 9/1998 | ............ | H01M 10/04 |
| JP | 2003-142068 | 5/2003 | | |
| JP | 2005-203192 | * 7/2005 | ............. | H01M 2/30 |
| JP | 2005-528741 | 9/2005 | | |
| JP | 2006-156401 | 6/2006 | | |
| JP | 2008-041264 | 2/2008 | | |
| JP | 2009-087600 | 4/2009 | | |
| KR | 10-2007-0110566 | 11/2007 | | |
| KR | 10-2008-0005621 | 1/2008 | | |
| KR | 1020080010735 A | * 1/2008 | ............. | H01M 2/34 |
| KR | 10-2008-0019311 | 3/2008 | | |
| WO | WO 03/094235 A1 | 11/2003 | | |
| WO | WO 03/094258 A2 | 11/2003 | | |
| WO | WO 2009/041136 A1 | 4/2009 | | |
| WO | WO 2009/149607 | 12/2009 | | |

OTHER PUBLICATIONS

Machine Translation and Abstract in English of JP10261428A.*
Machine Translation and Abstract in English of KR 1020080005621A.*
English machine translation of Japanese publication No. JP 2008-041264, 23 pps.
Extended European Search Report dated Feb. 11, 2011 in corresponding European Application No. EP 10193953.6, 5 pps.
Office Action dated Feb. 7, 2012 issued in European Patent Application No. 10 193 953.6-1227, 4 pages.
SIPO Office action dated Mar. 5, 2013, for corresponding Chinese Patent application 201010576984.X, with English translation, (15 pages).
KIPO Office action for Korean priority Patent Application No. 10-2010-0042962, dated Jul. 14, 2011, 4 pages.
Office action issued by the JPO in related Japanese Patent Application No. 2010-270089 dated Oct. 30, 2012, 2 pgs.
Patent Abstracts of Japan and English Machine Translation of Japanese Patent Publication No. JP 2003142068, 16 pgs.
SIPO Office action dated Jul. 31, 2013, with English translation, for Chinese Patent application 201110075901.3, (13 pages).
Patent Abstracts of Japan, and English machine translation of Japanese Publication 2005-203192 dated Jul. 28, 2005, (8 pages).
KIPO Office action dated Jul. 14, 2011 for Korean Patent application 10-2010-0042961, (4 pages).
KIPO Office action dated Jul. 17, 2012 for Korean Patent application 10-2012-0036968, (5 pages).
KIPO Office action dated Dec. 24, 2012, for Korean Patent application 10-2010-0025204, (2 pages).
KIPO Office action dated May 25, 2012, for Korean Patent application 10-2010-0055998, (7 pages).
KIPO Notice of Allowance dated Nov. 30, 2012, for Korean Patent application 10-2010-0055998, (5 pages).
EPO Search Report dated Sep. 30, 2011, for European Patent application 11169485.7, (5 pages).
JPO Office action dated Oct. 23, 2012, for Japanese Patent application 2010-286590, (2 pages).
JPO Notice of Allowance dated Mar. 19, 2013, for Japanese Patent application 2010-286590, (1 page).
U.S. Office action dated Sep. 4, 2012, for cross reference U.S. Appl. No. 12/855,417, (16 pages).
U.S. Office action dated Dec. 5, 2012, for cross reference U.S. Appl. No. 12/855,417, (11 pages).
U.S. Office action dated Mar. 25, 2013, for cross reference U.S. Appl. No. 12/855,417, (34 pages).
U.S. Office action dated Mar. 28, 2013, for cross reference U.S. Appl. No. 12/909,799, (14 pages).
U.S. Notice of Allowance dated Jul. 12, 2013, for cross reference U.S. Appl. No. 12/855,417, (8 pages).

* cited by examiner

RECHARGEABLE SECONDARY BATTERY HAVING IMPROVED SAFETY AGAINST PUNCTURE AND COLLAPSE

CROSS-REFERENCE TO RELATED APPLICATION

This application claims priority to and the benefit of Korean Patent Application No. 10-2010-0042962, filed May 7, 2010, in the Korean Intellectual Property Office and U.S. Provisional Application No. 61/267,354, filed Dec. 7, 2009, in the United States Patent and Trademark Office, the disclosures of which are incorporated herein in their entirety by reference.

TECHNICAL FIELD

Embodiments relate to a rechargeable secondary battery.

BACKGROUND ART

Generally, lithium ion secondary batteries are widely used as a power source for small-sized electronic devices such as notebook computers and cellular phones. Furthermore, since the lithium ion secondary batteries have high power, high capacity, and light weight when compared to other secondary batteries, they are also being used in hybrid and electric automobiles.

Lithium ion secondary batteries used as a power source of automobiles should satisfy safety and reliability requirements under the severest conditions. There are a plurality of test categories for safety, among which the three most extreme test categories are for puncture, collapse, and overcharge.

The puncture and collapse tests are performed to estimate secondary battery-related damage in the event of a car accident, and are thus very important test categories for safety. Specifically, in tests performed under extreme conditions such as a nail penetration test and a collapse test, the battery should not excessively increase in temperature.

SUMMARY

An aspect of the present invention provides a rechargeable secondary battery having improved safety against puncture and collapse.

According to at least one of the embodiments, a secondary battery includes a case; an electrode assembly housed in the case and having a first substantially planar surface and a second substantially planar surface; and a support plate between the electrode assembly and the case, the support plate including a first conductive plate having a substantially planar portion generally adjacent to and overlapping at least one of the substantially planar surfaces; and a second conductive plate having a substantially planar portion generally adjacent to and overlapping the substantially planar portion of the first conductive plate.

The rechargeable battery may also include an insulation plate between the first conductive plate and the second conductive plate. Further, the electrode assembly may include a first electrode, a second electrode and a separator between the first and second electrodes, wherein the first electrode has a coating portion coated with an active material and a non-coating portion absent the active material and wherein the first conductive plate is electrically coupled to the first electrode at the non-coating portion. Further, the non-coating portion of the first electrode may be welded to the first conductive plate.

In one embodiment, the first conductive plate has a first angled section generally corresponding to an angled region of the first electrode, and a first attachment region generally corresponding to the non-coating region of the first electrode. The first attachment region may extend from the first angled section. The first conductive plate and the non-coating portion of the first electrode may include the same material.

In one embodiment, the second electrode may have a coating portion coated with an active material and a non-coating portion absent the active, material and wherein the second conductive plate may be electrically coupled to the second electrode at the non-coating portion. Further, the second conductive plate may have a second angled section generally corresponding to an angled region of the second electrode, and a second attachment portion generally corresponding to the non-coating portion of the second electrode.

In one embodiment, the rechargeable battery may also include a first electrode terminal electrically coupled to the electrode assembly, and the first electrode terminal may include a welding portion that extends into the electrode assembly. Further, the support plate may include metal. Further, the metal may include aluminum or copper. Further, the first conductive plate and the second conductive plate may include different materials. Further, the first conductive plate may include aluminum and the second conductive plate may include copper. Further, the rechargeable battery may also include an additional support plate electrically coupled to another one of the substantially planar surfaces of the electrode assembly. Further, the rechargeable battery may also include an additional electrode assembly electrically coupled to the support plate. Further, a thickness of each of the first conductive plate and the second conductive plate may be between about 50 μm and about 400 μm. Further, a thickness of the first conductive plate may be different from a thickness of the second conductive plate.

In the secondary battery according to embodiments of the present invention, since the support plate is between the electrode assembly and the case, the support plate is firstly short-circuited when the secondary battery is punctured or collapsed. That is, when the secondary battery is punctured or collapsed, the support plate is activated, and thus, the secondary battery acts similarly as when it is short-circuited from the outside.

Since the support plate has a very low electric resistance, minimal heat is generated and the large current is quickly consumed when the support plate is short-circuited. As a result, the safety and reliability of the secondary battery may be improved. Additionally, since the support plate may have a relatively thick plate shape between the electrode assembly and the case, the support plate supports the electrode assembly to prevent the case from being significantly swelled.

Also, since the secondary battery according to an embodiment is configured such that the support plate is bent along the surface of the electrode assembly, the support plate may be easily welded, and the weld strength between the electrode assembly and the support plate may be improved. That is, the support plate includes the first section, the second section, and the third section. Since the first and second sections and the second and third sections are respectively bent at a certain angle, the support plate is naturally closely attached to the electrode assembly. Thus, the electrode assembly and the support plate may be easily welded to each other. In addition, the weld strength between the electrode assembly and the support plate may be improved. Furthermore, since a restoring or bias force is not present after the electrode assembly and the support plate are welded to each other, the weld strength between the electrode assembly and the support plate does not significantly deteriorate.

DETAILED DESCRIPTION

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Figure 1A:
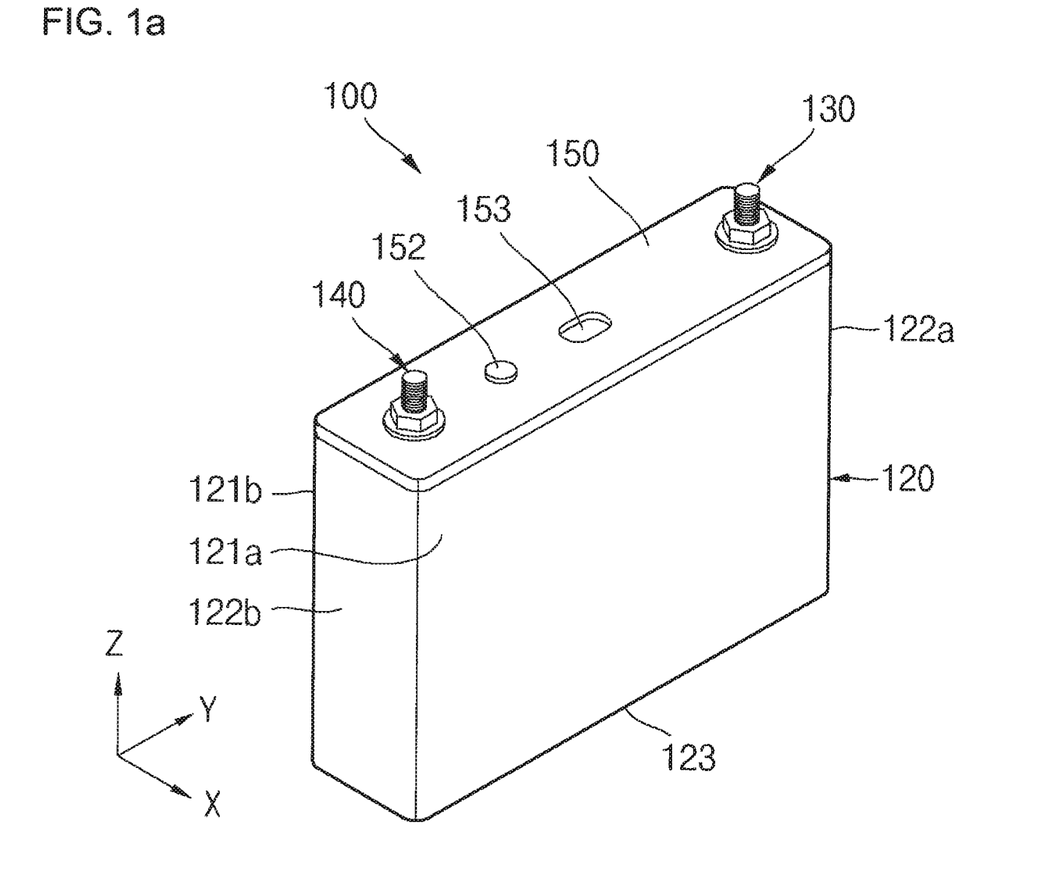
FIGS. 1A, 1B and 1C illustrate perspective, longitudinal sectional, and cross sectional views, respectively, of a secondary battery having improved safety against puncture and collapse according to an embodiment.
Figure 1B:
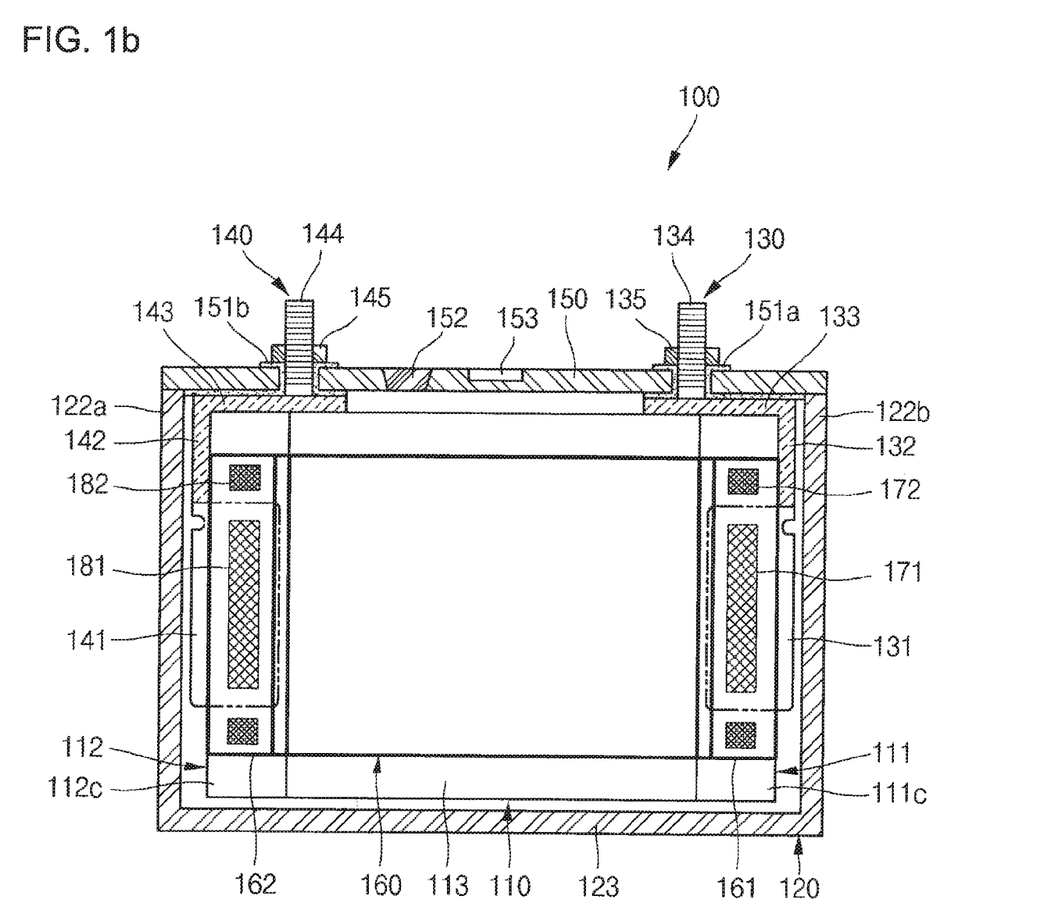
Figure 1C:
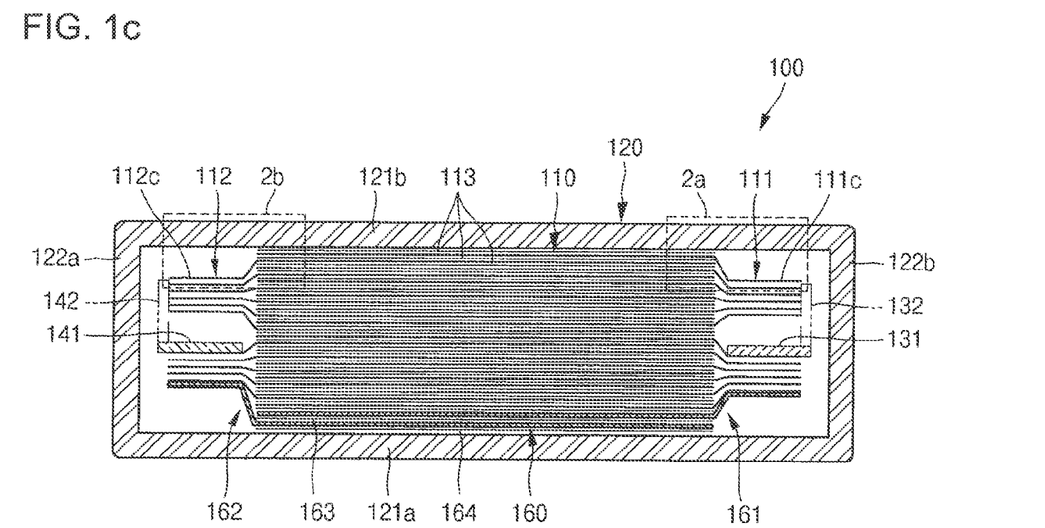

FIGS. 1A to 1C illustrate perspective, longitudinal sectional, and cross sectional views, respectively, of a secondary battery having improved safety against puncture and collapse according to an embodiment of the present invention.

A secondary battery 100 having improved safety against puncture and collapse according to an embodiment includes an electrode assembly 110, a case 120, a first electrode terminal 130, a second electrode terminal 140, a cap plate 150, and a support plate or short circuit member 160. The case 120 may be a can.

The electrode assembly 110 includes a first electrode 111, a second electrode 112, and a separator 113. The electrode assembly 110 may be wound in an approximately jelly-roll type or a stacked shape. That is, the electrode assembly 110 has a first substantially planar surface and a second substantially planar surface. The first electrode 111 may be a positive electrode plate, and the second electrode 112 may be a negative electrode plate. On the other hand, the first electrode 111 may be a negative electrode plate, and the second electrode 112 may be a positive electrode plate. The first electrode 111 includes a first metal foil and a first active material. When the first electrode 111 is the positive electrode plate, the first metal foil may be formed of aluminum, and the first active material may be lithium-based oxide. Also, the second electrode 112 includes a second metal foil and a second active material. When the second electrode 112 is the negative electrode plate, the second metal foil may be formed of copper, and the second active material may be graphite. However, this embodiment is not limited to these materials. The separator 113 is located between the first electrode 111 and the second electrode 112. The separator 113 may be formed of one of any materials such as porous polyethylene (PE) and polypropylene (PP) or its equivalent, but is not limited thereto. The separator may be substantially on both side surfaces of the first electrode 111 or the second electrode 112. The separator 113 is located at an outermost side to prevent a portion of the electrode assembly 110 from being short-circuited by the case 120, the cap plate 150, and/or the support plate 160.

In one embodiment, the first electrode 111 may include a first non-coating portion 111c on which a positive electrode active material is not coated. The first non-coating portion 111c may protrude through one side of the separator 113 to the outside. Also, the second electrode 112 may include a second non-coating portion 112c on which a negative electrode active material is not coated. The second non-coating portion 112c may protrude through another side of the separator 113 to the outside. That is, the first non-coating portion 111c and the second non-coating portion 112c may protrude in directions opposite to each other with respect to the separator 113.

The case 120 has two wide side surfaces 121a and 121b, two narrow side surfaces 122a and 122b, and one bottom surface 123. Also, the case 120 has an opened upper side. The electrode assembly 110 is received into the case 120 together with an electrolyte. In one embodiment, the first non-coating portion 111c and the second non-coating portion 112c of the electrode assembly 110 face the two narrow side surfaces 122a and 122b, respectively. Also, the case 120 may be formed of one of any materials such as aluminum, copper, iron, SUS, ceramic, and polymer, or equivalents thereof, but is not limited thereto.

The first electrode terminal 130 and the second electrode terminal 140 are electrically coupled to the first electrode 111 and the second electrode 112 of the electrode assembly 110, respectively. In one embodiment, the first electrode terminal 130 may be welded to the first electrode 111, and the second electrode terminal 140 may be welded to the second electrode 112. Furthermore, the first electrode terminal 130 may be welded to the first non-coating portion 111c of the first electrode 111. Also, the second electrode terminal 140 may be welded to the second non-coating portion 112c of the second electrode 112.

The first electrode terminal 130 includes a weld part 131, a first extension part 132, a second extension part 133, and a bolt extension part 134. The weld part 131 is inserted into the first electrode 111 of the electrode assembly 110, i.e., in between adjacent first non-coating portions 111c. Similarly, the second electrode terminal 140 includes a weld part 141, a first extension part 142, a second extension part 143, and a bolt extension part 144. The weld part 141 is inserted into the second electrode 112 of the electrode assembly 110, i.e., between adjacent second non-coating portions 112c. Furthermore, each of the bolt extension parts 134 and 144 of the first electrode terminal 130 and the second electrode terminal 140 pass through the cap plate 150 to protrude to the outside.

The cap plate 150 covers the open end of case 120 and allows the first electrode terminal 130 and the second electrode terminal 140 to protrude to the outside. A boundary or seam between the cap plate 150 and the case 120 may be welded using a laser beam. In addition, each of the bolt extension parts 134 and 144 of the first electrode terminal 130 and the second electrode terminal 140 pass through the cap plate 150, and insulation materials 151a and 151b may be on an outer circumference of the bolt extension parts 134 and 144. Thus, the first electrode terminal 130 and the second electrode terminal 140 are electrically insulated from the cap plate 150. Accordingly, the case 120 and the cap plate 150 may be has a property of electrical neutrality. That is, the case 120 and the cap plate 150 may not have a polarity (positive or negative pole). However in some cases, the case 120 and the cap plate 150 may have polarities, respectively.

Nuts 135 and 145 are coupled to the bolt extension parts 134 and 144 of the first electrode terminal 130 and the second electrode terminal 140, respectively. Thus, the first electrode terminal 130 and the second electrode terminal 140 are firmly fixed to the cap plate 150. Furthermore, an electrolyte plug 152 may be coupled to the cap plate 150. Also, a safety vent 153 having a relatively thin thickness may be on the cap plate 150. The cap plate 150 may be formed of the same material as the case 120.

The support plate or short circuit member 160 is located between the electrode assembly 110 and the case 120. In one embodiment, the support plate 160 is located between the electrode assembly 110 and at least one wide side surface 121a of the case 120.

The support plate 160 includes a first conductive plate 161, a second conductive plate 162, and an insulation plate 163 between the first conductive plate 161 and the second conductive plate 162. The first conductive plate 161 is electrically coupled to the first non-coating portion 111c of the first electrode 111. In one embodiment, the first conductive plate 161 is welded to the first non-coating portion 111c. The second conductive plate 162 is electrically coupled to the second non-coating portion 112c of the second electrode 112. In one embodiment, the second conductive plate 162 is welded to the second non-coating portion 112c. The insulation plate 163 prevents the first conductive plate 161 and the second conductive plate 162 from being electrically short-circuited to each other until the support plate 160 is activated. Furthermore, an insulation plate 164 is located between the support plate 160 and the case 120. The insulation plate 164 prevents the first conductive plate 161 and the case 120 from being electrically short-circuited to each other until the support plate 160 is activated.

As described above, when the secondary battery 100 is punctured or collapsed, the insulation plate 163 may be torn or damaged to electrically short-circuit the first conductive plate 161 from the second conductive plate 162 of the support plate 160. Since the first conductive plate 161 and the second conductive plate 162 of the support plate 160 have relatively low, electric resistances, minimal heat is generated and large current is quickly consumed when they are short-circuited. As a result, when the secondary battery 100 is punctured or collapsed, safety and reliability of the secondary battery 100 may be improved when the secondary battery contains the support plate 160.

Also, since the support plate 160 has a relatively thick plate shape and is located between the electrode assembly 110 and the case 120, the support plate 160 may support the electrode assembly 110 and prevent the case 120 from swelling.

Also, since support plate 160 is designed in a shape in which it is bent to generally correspond to the surface of the electrode assembly 110, the support plate 160 may be easily welded, and the weld strength between the electrode assembly 110 and the support plate 160 may be improved. In one embodiment, the support plate 160 includes a first section, a second section, and a third section. Since the first and second sections and the second and third sections are respectively bent at a certain angle with respect to each other to generally conform to a shape of the electrode assembly, the support plate 160 is close to the electrode assembly 110. Thus, the electrode assembly 110 and the support plate 160 may be easily welded to each other and the weld strength between the electrode assembly 110 and the support plate 160 may be improved. Furthermore, since a restoring force does not exist after the electrode assembly 110 and the support plate 160 are welded to each other, the weld strength between the electrode assembly 110 and the support plate 160 is not easily or quickly deteriorated. In one embodiment, when the support plate 160 has a flat plate shape and is welded to the electrode assembly 110, the support plate 160 is bent into a leaf spring shape. Thus, a restoring force may occur as the support plate 160, and thus, the electrical connection between the electrode assembly 110 and the support plate 160 may be cut off.

A reference numeral 171 of FIG. 1B represents a welded region at which the first non-coating portion 111c of the electrode assembly 110, the first extension part 132 of the first electrode terminal 130, and the first conductive plate 161 of the support plate 160 are welded together. A reference numeral 172 represents a welded region at which the first non-coating portion 111c of the electrode assembly 110 and the first conductive plate 161 of the support plate 160 are welded together.

Similarly, a reference numeral 181 of FIG. 1B represents a welded region at which the second non-coating portion 112c of the electrode assembly 110, the extension part 142 of the second electrode terminal 140, and the second conductive plate 162 of the support plate 160 are welded together. A reference numeral 182 represents a welded region at which the second non-coating portion 112c of the electrode assembly 110 and the second conductive plate 162 of the support plate 160 are welded together.

Figure 2A:
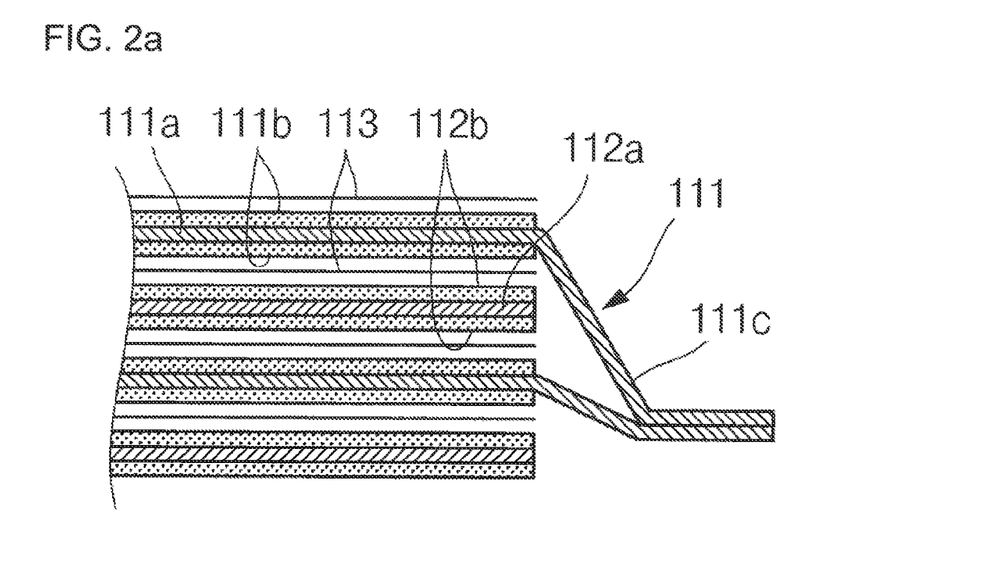
FIGS. 2A and 2B illustrate enlarged views of portions 2a and 2b of FIG. 1C.
Figure 2B:
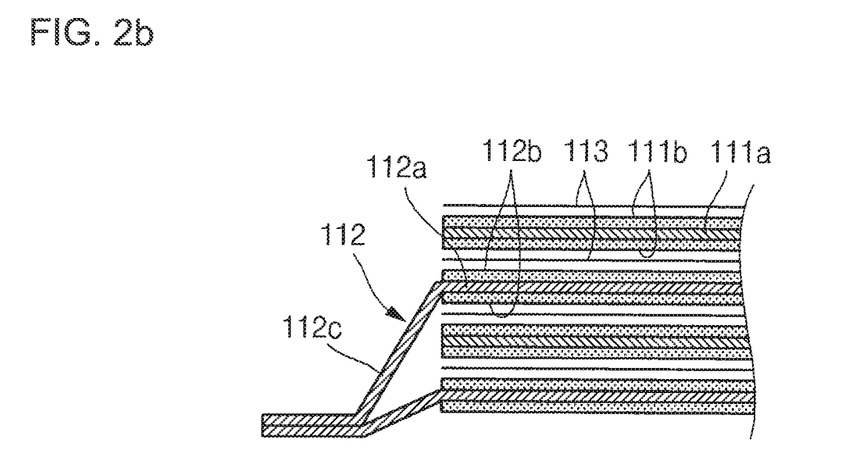

FIGS. 2A and 2B illustrate enlarged views of portions 2a and 2b of FIG. 1C.

Referring to FIG. 2A, the electrode assembly 110 includes the first electrode 111. The first electrode 111 includes a first metal foil 111a (e.g., aluminum foil or aluminum mesh), a first active material 111b (e.g., lithium-based oxide), and the first non-coating portion 111c on which a first active material is not coated.

Also, the electrode assembly 110 includes the second electrode 112. The second electrode 112 includes a second metal foil 112a (e.g., copper foil), a second active material 112b (e.g., graphite), and the second non-coating portion 112c on which a second active material is not coated. Furthermore, the separators 113 formed of PP or PE are located on both side surfaces of the first electrode 111, and the separators 113 formed of PP or PE are located on both side surfaces of the second electrode 112.

Here, the first non-coating portion 111c extends through one side of the separator 113 to the outside. The first non-coating portions 111c are closely attached or welded to each other to improve the weldability between the weld part 131 of the first electrode terminal 130 and the first conductive plate 161 of the support plate 160.

Also, the second first non-coating portion 112c extends through another side of the separator 113 to the outside. The second non-coating portions 112c are closely attached or welded to each other to improve weldability between the weld part 141 of the second electrode terminal 140 and the second conductive plate 162 of the support plate 160.

Figure 3A:
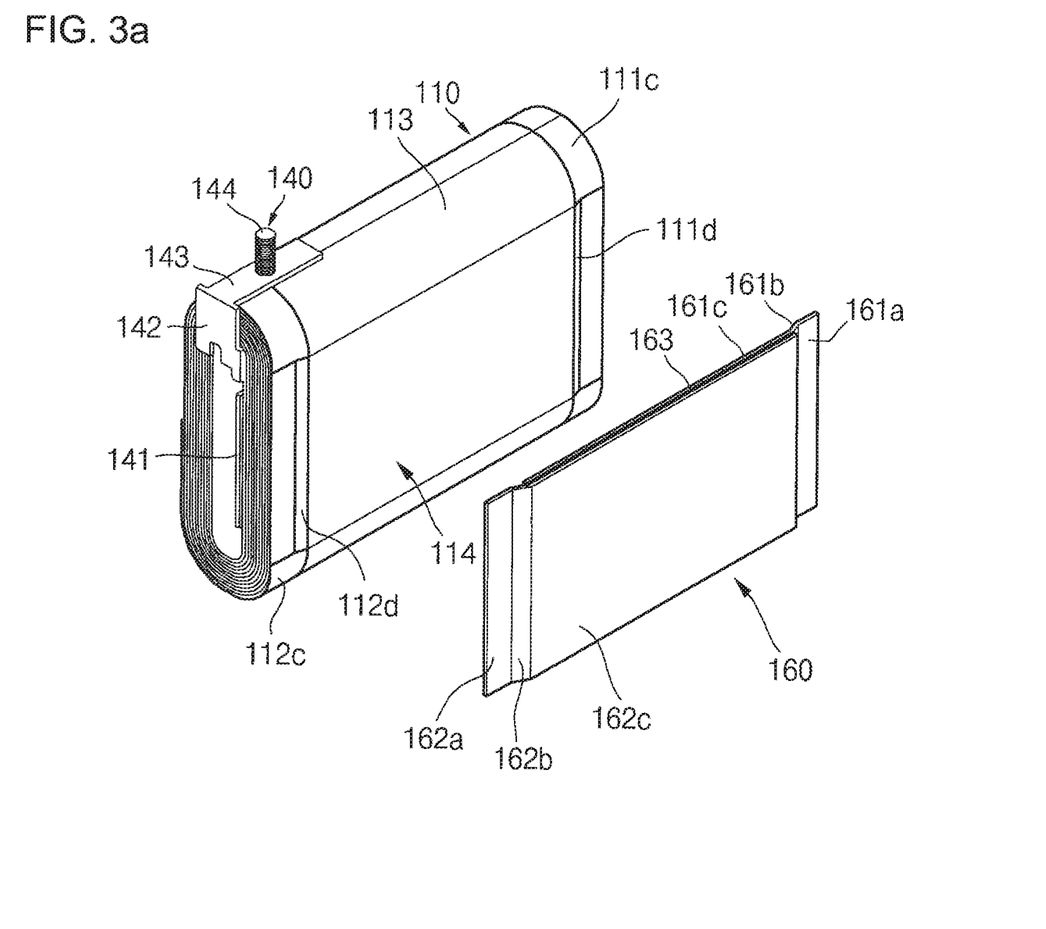
FIGS. 3A and 3B illustrate perspective views of a relationship between an electrode assembly and a support plate in a secondary battery according to an embodiment of the present invention.
Figure 3B:
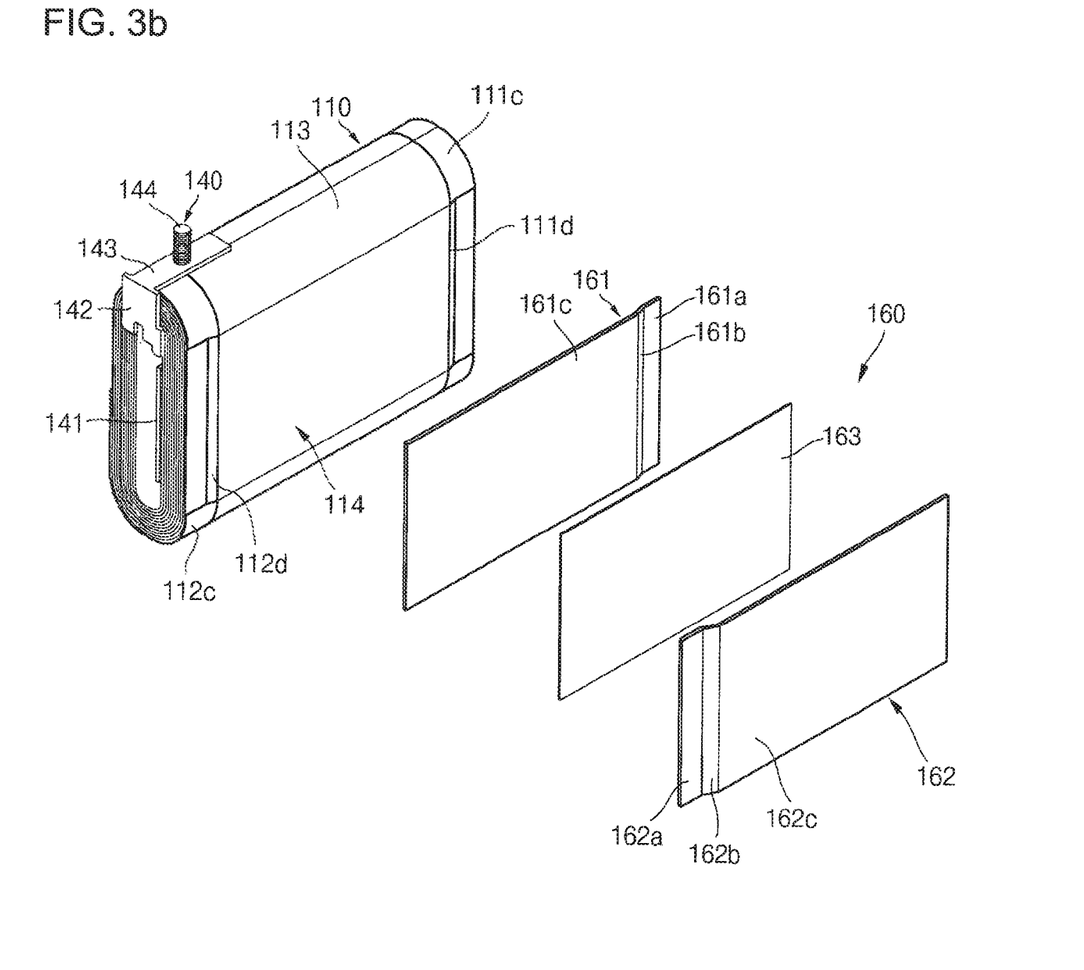

FIGS. 3A and 3B illustrate perspective views of a relation between an electrode assembly and a support plate in a secondary battery having improved safety against puncture and collapse according to another embodiment.

Referring to FIGS. 3A and 3B, the support plate 160 includes the first conductive plate 161 electrically coupled to the first non-coating portion 111c of the first electrode 111, the second conductive plate 162 electrically coupled to the second non-coating portion 112c of the second electrode 112, and the insulation plate 163 located between the first conductive plate 161 and the second conductive plate 162.

The first conductive plate 161 includes a first substantially planar section or a first attachment region 161a welded to the first non-coating portion 111c, a second section or angled section 161b extending and bent from the first section 161a, and a third substantially planar section or a planar portion 161c extending from the second section 161b and covering a front wide side surface 114 of the electrode assembly 110. In one embodiment, a total horizontal width of the first section 161a and the second section 161b is almost equal to a horizontal width of the first non-coating portion 111c. The third section 161c has an area almost equal to that of the front wide side surface 114 of the electrode assembly 110. Also, since the first section 161a is directly welded to the first non-coating portion 111c, the first section 161a is electrically coupled to the first non-coating portion 111c. Furthermore, the second section 161b connects the first section 161a to the third section 161c and is bent at a certain angle. Thus, the first section 161a is closely attached to the first non-coating portion 111c by the second section 161b, and the third section 161c is closely attached to the front wide side surface 114 of the electrode assembly 110. That is, the first non-coating portions 111c are closely attached and compressed against each other to improve weldability with the first weld part 131. Thus, the bending portion 111d is located on the first non-coating portion 111c, and thereby is closely attached to the second section 161b of the first conductive plate 161.

As described above, the first section 161a is closely attached to the first non-coating portion 111c, and the third section 161c is closely attached to the front wide side surface 114 of the electrode assembly 110. Substantially, the third section 161c is closely attached to the insulation plate 163. The first conductive plate 161 may be formed of aluminum (Al) or copper (Cu), but is not limited thereto. When the first non-coating portion 111c is formed of aluminum, the first conductive plate 161 may also be formed of aluminum. Also, the first conductive plate 161 may have a thickness of about 50 μm to about 400 μm. Within the range of the thickness value, a temperature increment of the secondary battery is relatively low when the secondary battery is short-circuited due to the puncture or collapse. In addition, although the first conductive plate 161 is provided as a single sheet in this embodiment, the first conductive plate 161 may be provided in plurality.

The insulation plate 163 is located between the first conductive plate 161 and the second conductive plate 162. The insulation plate 163 allows the first conductive plate 161 and the second conductive plate 162 to be electrically coupled to each other before the support plate 160 is activated. Substantially, the insulation plate 163 may be formed of the same material as the separator. That is, the insulation plate 163 may be formed of PE or PP, but is not limited thereto.

The second conductive plate 162 includes a first substantially planar section or a first attachment region 162a welded to the second non-coating portion 112c, a second section or angled section 162b extending and bent from the second section 162a, and a third substantially planar section or a planar portion 162c extending from the second section 162b and covering the front wide side surface 114 of the electrode assembly 110. Here, a total horizontal width of the first section 162a and the second section 162b is almost equal to a horizontal width of the second non-coating portion 112c. The third section 162c has an area almost equal to that of the front wide side surface 114 of the electrode assembly 110. Since the first section 162a is directly welded to the second non-coating portion 112c, the first section 162a is electrically coupled to the second non-coating portion 112c. Furthermore, the second section 162b connects the first section 162a to the third section 162c and is bent at a certain angle. Thus, the first section 162a is closely attached to the second non-coating portion 112c by the second section 162b, and the third section 162c is closely attached to the front wide side surface 114 of the electrode assembly 110. In one embodiment, the second non-coating portions 112c are closely attached and compressed against each other to improve weldability with the second weld part 141. Thus, the bending portion 112d is on the second non-coating portion 112c, and thereby is closely attached to the second section 162b of the second conductive plate 162. As described above, the first section 162a is closely attached to the second non-coating portion 112c, and the third section 162c is closely attached to the front wide side surface 114 of the electrode assembly 110. The second conductive plate 162 may be formed of aluminum (Al) or copper (Cu), but is not limited thereto. When the second non-coating portion 112c is formed of copper, the second conductive plate 162 may also be formed of copper. Also, the second conductive plate 162 may have an experimental thickness of about 50 μm to about 400 μm. Within the range of the thickness value, a temperature increment of the secondary battery is relatively low when the secondary battery is short-circuited due to puncture or collapse. In addition, although the second conductive plate 162 is provided as a single sheet in this embodiment, the second conductive plate 162 may be provided in plurality.

Figure 4A:
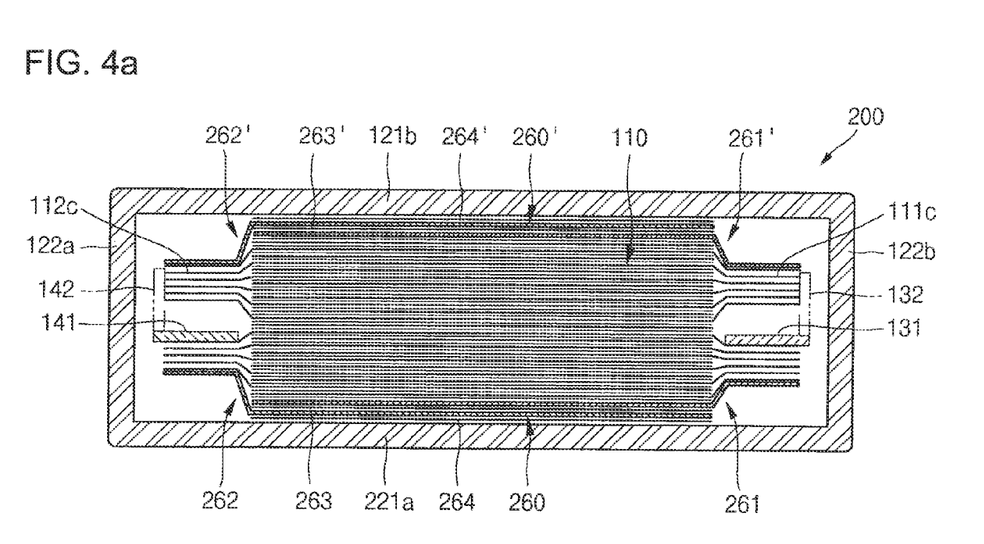
FIGS. 4A and 4B illustrate a cross sectional view of a secondary battery and a perspective view of a relationship between an electrode assembly and a support plate, respectively, according to still another embodiment of the present invention.
Figure 4B:
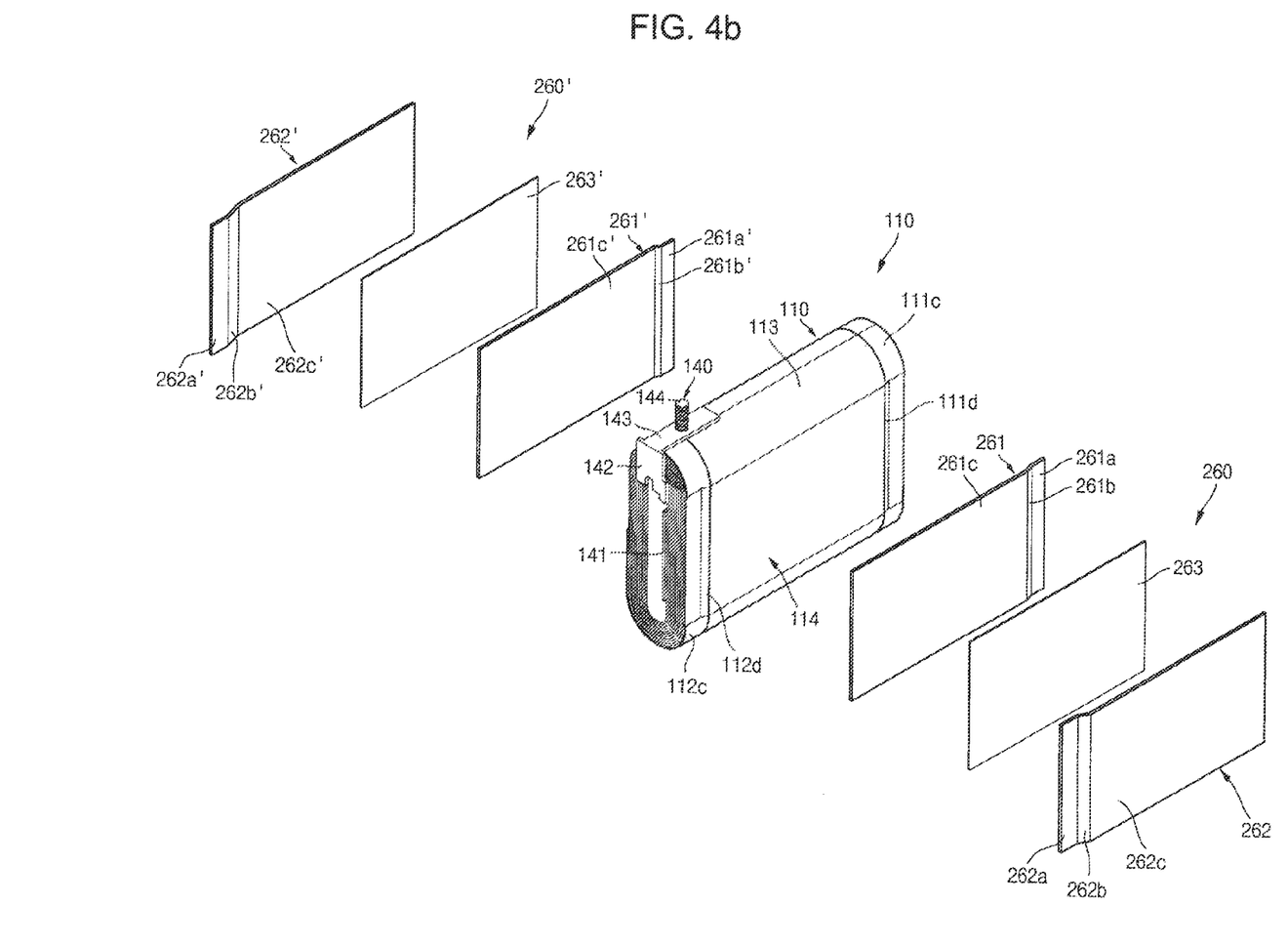

FIGS. 4A and 4B illustrate a cross sectional view of a secondary battery having improved safety against puncture and collapse and a perspective view of a relation between an electrode assembly and a support plate, respectively, according to another embodiment.

Referring to FIGS. 4A and 4B, a secondary battery 200 having improved safety against puncture and collapse according to an embodiment may include two support plates 260 and 260'. In one embodiment, the first support plate 260 may be located on a front wide side surface 114 of an electrode assembly 110, and the second support plate 260' may be located on a rear wide side surface of the electrode assembly 110 opposite the front wide side surface. Similarly to the embodiments described above, the first and second support plates 260 and 260' respectively include first conductive plates 261 and 261', second conductive plates 262 and 262', and insulation plates 263 and 263'.

The first conductive plates 261 and 261' of the first and second support plates 260 and 260' are electrically coupled to a first non-coating portion 111c, respectively, and the second conductive plates 262 and 262' are electrically coupled to a second non-coating portion 112c.

Here, the first conductive plates 261 and 261' including first sections 261 and 261', bent second sections 261b and 261b', and bent third sections 261c and 261c', the second conductive plates 262 and 262' including first sections 262 and 262', second sections 262b and 262b', and bent third sections 262c and 262c', and the insulation plates 263 and 263' have substantially the same configuration and interrelation as those of the above-described embodiment. Thus, their duplicated descriptions will be omitted.

As described above, in the secondary battery 200 according to the present embodiment, since the support plates 260 and 260' are located between an electrode assembly 110 and the front wide side surface of a case 120 as well as between the electrode assembly 110 and the rear wide side surface 121b of the case 120, the secondary battery 200 has improved safety against puncture and collapse.

In addition, since the support plates 260 and 260' are disposed at front and rear sides of the electrode assembly 110, respectively, they may effectively prevent the secondary battery from being swelled.

Figure 5:
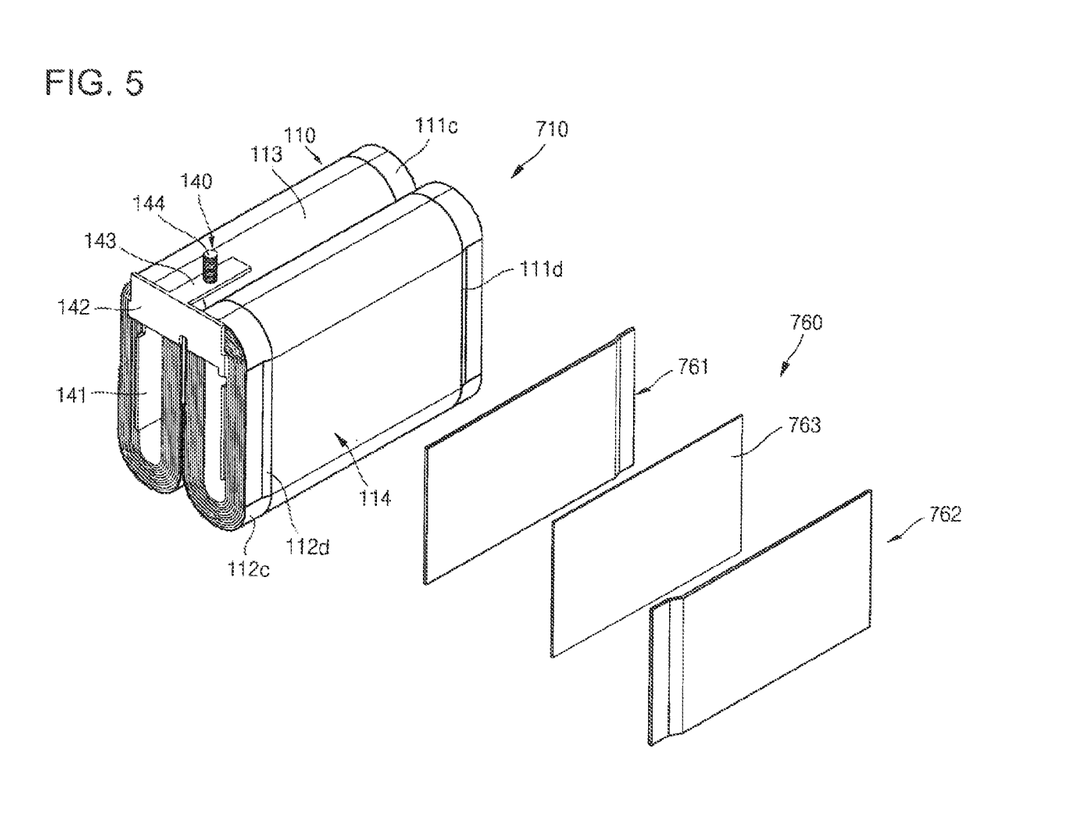
FIG. 5 illustrates an exploded perspective view of a relationship between an electrode assembly and a support plate in a secondary battery according to another embodiment of the present invention.

FIG. 5 illustrates an exploded perspective view of a relation between an electrode assembly and a support plate in a secondary battery having improved safety against puncture and collapse according to another embodiment.

Referring to FIG. 5, two or more electrode assemblies 710 may be provided. A first electrode terminal (not shown) and a second electrode terminal 140 are electrically coupled to the two or more electrode assemblies 710. For example, the second electrode terminal 140 may include a weld part 141, a first extension part 142, a second extension part 143, and a bolt extension part 144. Also, the second electrode terminal 140 is electrically coupled to a second non-coating portion 112c located on each of the two electrode assemblies 710. The first electrode terminal has the same structure as the second electrode terminal 140. The first electrode terminal is electrically coupled to a first non-coating portion 111c located on each of the two electrode assemblies 710.

A support plate 760 may be located on any one of front wide side surfaces 114 of the two electrode assemblies 710. The support plate 760 includes a first conductive plate 761, a second conductive plate 762, and an insulation plate 763. Substantially, the support plate 760 is located between the any one of the front wide side surfaces 114 of the two electrode assemblies 710 and a case.

Thus, another embodiment may provide a secondary battery having large-capacity as well as improved safety against puncture and collapse. In addition, it may effectively prevent the secondary battery from swelling.

Figure 6:
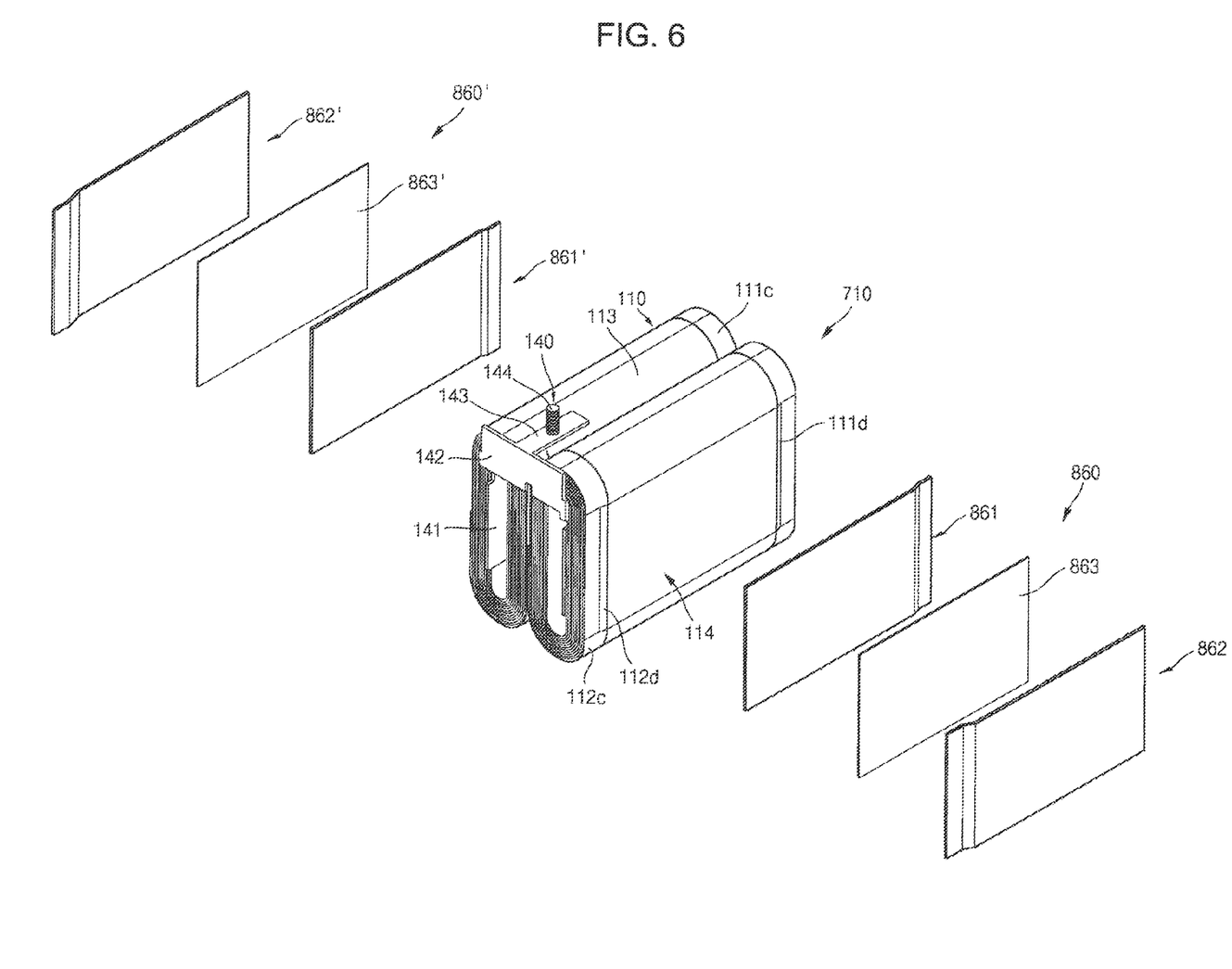
FIG. 6 illustrates an exploded perspective view of a relationship between an electrode assembly and a support plate in a secondary battery according to still another embodiment of the present invention.

FIG. 6 illustrates an exploded perspective view of a relation between an electrode assembly and a support plate in a secondary battery having improved safety against puncture and collapse according to another embodiment.

Referring to FIG. 6, two or more electrode assemblies 710 may be provided. A first electrode terminal (not shown) and a second electrode terminal 140 are electrically coupled to the two or more electrode assemblies 710.

A first support plate 860 may be located on any one of front wide side surfaces 114 of the two electrode assemblies 710, and a second support plate 860' may be located on the other rear wide side surface of the two electrode assemblies 710. The first support plate 860 includes a first conductive plate 861, a second conductive plate 862, and an insulation plate 863. The second support plate 860' includes a first conductive plate 861', a second conductive plate 862', and an insulation plate 863'.

As above-described, since the first support plate 860 is disposed between the electrode assembly and the front wide side surface of a case and the second support plate 860' is located between the electrode assembly and the rear wide side surface of the case, a secondary battery having further improved safety against puncture and collapse may be provided. In addition, the swelling of the secondary battery may be prevented or minimized.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

DESCRIPTION OF THE SYMBOLS IN MAIN PORTIONS OF THE DRAWINGS

| | |
|---|---|
| 100: Secondary battery having improved safety against puncture and collapse | |
| 110: Electrode assembly | 111: First electrode |
| 111a: First metal foil | 111b: First active material |
| 111c: First non-coating portion | 112: Second electrode |
| 112a: Second metal foil | 112b: Second active material |
| 112c: second non-coating portion | 113: Separator |
| 120: Case | 121a, 121b: Wide side surfaces |
| 122a, 122b: narrow side surfaces | 123: Bottom surface |
| 130: First electrode terminal | 131: Weld part |
| 132: First extension part | 133: Second extension part |
| 134: Bolt extension part | 135: Nut |
| 140: Second electrode terminal | 141: Weld part |
| 142: First extension part | 143: Second extension part |
| 144: Bolt extension part | 145: Nut |
| 150: Cap plate | 151a, 151b: Insulation materials |
| 152: Electrolyte plug | 153: Safety vent |
| 160: Support plate | 161: First conductive plate |
| 161a: First section | 161b: Second section |
| 161c: Third section | 162: Second conductive plate |
| 162a: First section | 162b: Second section |
| 162c: Third section | |

What is claimed is:

1. A rechargeable battery comprising:
   a case;
   an electrode assembly housed in the case and having a first substantially planar surface and a second substantially planar surface, wherein the electrode assembly comprises a first electrode, a second electrode and a separator between the first and second electrodes, wherein the first electrode has a coating portion coated with an active material and a non-coating portion absent the active material and being bent at an angle from the coating portion;
   a plurality of terminals extending from the case; and
   a support plate between the electrode assembly and the case, the support plate comprising:
   a first conductive plate having a substantially planar portion generally adjacent to and overlapping at least one of the substantially planar surfaces of the electrode assembly and a first angled section being bent at an angle from the substantially planar portion and generally adjacent to and overlapping the non-coating portion; and
   a second conductive plate having a substantially planar portion generally adjacent to and overlapping the substantially planar portion of the first conductive plate, wherein the first and second conductive plates are entirely spaced from the terminals, and wherein the non-coating portion is located between the first conductive plate and one of the terminals.

2. The rechargeable battery of claim 1, further comprising an insulation plate between the first conductive plate and the second conductive plate.

3. The rechargeable battery of claim 1, wherein the non-coating portion is welded to the first conductive plate.

4. The rechargeable battery of claim 1, wherein the first conductive plate has a first attachment region generally adjacent to and overlapping the non-coating portion of the first electrode.

5. The rechargeable battery of claim 4, wherein the first attachment region extends from the first angled section.

6. The rechargeable battery of claim 1, wherein the first conductive plate and the non-coating portion comprise the same material.

7. The rechargeable battery of claim 1, wherein the second electrode has a coating portion coated with an active material and a non-coating portion absent the active material and being bent at an angle from the coating portion and wherein the second conductive plate is electrically coupled to the second electrode at the non-coating portion of the second electrode.

8. The rechargeable battery of claim 7, wherein the second conductive plate has a second angled section being bent at an angle from the substantially planar portion and a second attachment portion both generally adjacent to and overlapping the non-coating portion of the second electrode.

9. The rechargeable battery of claim 1, further comprising a first electrode terminal electrically coupled to the electrode assembly, the first electrode terminal comprising a welding portion that extends into the electrode assembly.

10. The rechargeable battery of claim 1, wherein the support plate comprises metal.

11. The rechargeable battery of claim 10, wherein the metal comprises aluminum or copper.

12. The rechargeable battery of claim 1, wherein the first conductive plate and the second conductive plate comprise different materials.

13. The rechargeable battery of claim 12, wherein the first conductive plate comprises aluminum and the second conductive plate comprises copper.

14. The rechargeable battery of claim 1, further comprising an additional support plate electrically coupled to another one of the substantially planar surfaces of the electrode assembly.

15. The rechargeable battery of claim 14, further comprising an additional electrode assembly electrically coupled to the additional support plate.

16. The rechargeable battery of claim 1, wherein a thickness of each of the first conductive plate and the second conductive plate is between about 50 μm and about 400 μm.

17. The rechargeable battery of claim 1, wherein a thickness of the first conductive plate is different from a thickness of the second conductive plate.

* * * * *